(12) United States Patent
Miyamoto et al.

(10) Patent No.: US 11,343,223 B2
(45) Date of Patent: May 24, 2022

(54) COMMUNICATION APPARATUS, COMMUNICATION METHOD AND PROGRAM

(71) Applicant: Nippon Telegraph and Telephone Corporation, Tokyo (JP)

(72) Inventors: Katsuma Miyamoto, Tokyo (JP); Hideaki Iwata, Tokyo (JP); Akihiro Okada, Tokyo (JP); Hideo Tsuchiya, Tokyo (JP); Shunsuke Homma, Tokyo (JP); Akihiro Kimura, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 16/968,752

(22) PCT Filed: Feb. 25, 2019

(86) PCT No.: PCT/JP2019/007129
§ 371 (c)(1),
(2) Date: Aug. 10, 2020

(87) PCT Pub. No.: WO2019/163998
PCT Pub. Date: Aug. 29, 2019

(65) Prior Publication Data
US 2020/0412690 A1    Dec. 31, 2020

(30) Foreign Application Priority Data

Feb. 26, 2018  (JP) .............................. JP2018-032459

(51) Int. Cl.
*H04L 29/12*  (2006.01)
*H04L 12/28*  (2006.01)
*H04L 61/5014*  (2022.01)

(52) U.S. Cl.
CPC ...... *H04L 61/2015* (2013.01); *H04L 12/2858* (2013.01); *H04L 12/2898* (2013.01)

(58) Field of Classification Search
CPC ............. H04L 61/2015; H04L 12/2858; H04L 12/2898
(Continued)

(56) References Cited

U.S. PATENT DOCUMENTS 7,127,524 B1 * 10/2006 Renda ..................... H04L 29/12
                                                      709/245
7,694,343 B2 *  4/2010 Sobel .................. H04L 61/2514
                                                       726/27

(Continued)

OTHER PUBLICATIONS

R. Challa, S. M. Raza, S. Jeon, H. Choo and p. Thorat, "Refactoring Future Residential Networks into Slices," 2018 IEEE Conference on Network Function Virtualization and Software Defined Networks (NFV-SDN), 2018, pp. 1-6, doi: 10.1109/NFV-SDN .2018. 8725676. (Year: 2018).*

(Continued)

*Primary Examiner* — Melvin H Pollack
(74) *Attorney, Agent, or Firm* — Fish & Richardson P.C.

(57) ABSTRACT

A communication apparatus connected to a virtual apparatus having an address dispensing function via an access network is provided, wherein the communication apparatus includes a communication confirmation unit configured to perform a communication confirmation between the virtual apparatus and the communication apparatus; and an address dispensing unit configured to dispense an address to a user terminal under control of the communication apparatus when communication between the virtual apparatus and the communication apparatus is not able to be confirmed by the communication confirmation unit, and the address dispensing unit causes the user terminal to forcibly release the address when the communication between the virtual appa- (Continued)

ratus and the communication apparatus is able to be confirmed by the communication confirmation unit.

9 Claims, 19 Drawing Sheets

(58) Field of Classification Search
USPC ........................................................ 709/220
See application file for complete search history.

(56) References Cited

U.S. PATENT DOCUMENTS

| | | | | |
|---|---|---|---|---|
| 8,365,018 | B2* | 1/2013 | McIntosh | H04L 43/50 714/23 |
| 9,106,707 | B2* | 8/2015 | Bigall | H04L 41/0803 |
| 9,374,267 | B2* | 6/2016 | Poirier | H04L 63/0892 |
| 9,736,111 | B2* | 8/2017 | Lopez Da Silva | H04L 61/2592 |
| 9,871,712 | B1* | 1/2018 | Sorenson, III | H04L 43/0817 |
| 9,905,100 | B2* | 2/2018 | Gillen | G06Q 50/28 |
| 10,069,903 | B2* | 9/2018 | Sorenson, III | H04L 67/1038 |
| 10,133,593 | B1* | 11/2018 | Sethuramalingam | G06F 9/45558 |
| 10,152,211 | B2* | 12/2018 | Koushik | H04L 63/10 |
| 10,257,089 | B2* | 4/2019 | Bays | H04L 49/70 |
| 10,348,621 | B2* | 7/2019 | Bays | H04L 49/70 |
| 10,404,532 | B2* | 9/2019 | Ramasubramani | H04L 41/0813 |
| 10,481,938 | B2* | 11/2019 | Cook | H04L 12/28 |
| 10,735,275 | B2* | 8/2020 | Dravid | H04L 41/0896 |
| 10,771,431 | B2* | 9/2020 | Dong | G06F 9/45533 |
| 10,778,467 | B2* | 9/2020 | Kim | H04L 12/2834 |
| 10,862,711 | B2* | 12/2020 | Koat | H04L 12/66 |
| 10,868,795 | B2* | 12/2020 | Bichot | H04L 61/35 |
| 10,887,160 | B2* | 1/2021 | Li | H04L 12/283 |
| 2017/0279764 | A1* | 9/2017 | Nishikawa | H04L 61/2015 |
| 2018/0077016 | A1* | 3/2018 | Onno | H04L 41/0813 |
| 2019/0223023 | A1* | 7/2019 | Altay | H04W 4/50 |
| 2021/0168582 | A1* | 6/2021 | Ceccarelli | H04W 40/34 |

OTHER PUBLICATIONS

P. Minoves, 0. Frendved, B. Peng, A. Mackarel and D. Wilson, "Virtual CPE: Enhancing CPE's deployment and operations through virtualization," 4th IEEE International Conference on Cloud Computing Technology and Science Proceedings, 2012, pp. 687-692, doi: 10.1109/CloudCom.2012.6427560. (Year: 2012).*

A. Kimura, S. Kawano, H. Tsuchiya, S. Homma and A. Okada, "Evaluation of Virtual Customer Premises Equipment Prototype System with Open Source Software," 2018 IEEE 7th International Conference on Cloud Networking (CloudNet), 2018, pp. 1-3, doi: 10.1109/CloudNet.2018.8549554. (Year: 2018).*

N. Huang, C. Li, C. Chen, I. Hsu, C. Li and C. Chen, "A novel vCPE framework for enabling virtual network functions with multiple flow tables architecture in SDN switches," 2017 19th Asia-Pacific Network Operations and Management Symposium (APNOMS), 2017, pp. 64-69, doi: 10.1109/APNOMS.2017.8094180. (Year: 2017).*

F. Sánchez and D. Brazewell, "Tethered Linux CPE for IP service delivery," Proceedings of the 2015 1st IEEE Conference on Network Softwarization (NetSoft), 2015, pp. 1-9, doi: 10.1109/NETSOFT.2015.7116166. (Year: 2015).*

P. Cota and J. Šabec, "CPE virtualization by unifying NFV, SDN and Cloud technologies," 2016 39th International Convention on Information and Communication Technology, Electronics and Microelectronics (MIPRO), 2016, pp. 553-558, doi: 10.1109/MIPRO.2016.7522204. (Year: 2016).*

[No Author Listed], "ETSI GS NFV 001 V1.1.1—Network Functions Virtualisation (NFV): Use Cases," ETSI, Oct. 2013, 50 pages.

* cited by examiner

COMMUNICATION APPARATUS, COMMUNICATION METHOD AND PROGRAM

CROSS-REFERENCE TO RELATED APPLICATIONS

This application is a National Stage application under 35 U.S.C. § 371 of International Application No. PCT/JP2019/007129, having an International Filing Date of Feb. 25, 2019, which claims priority to Japanese Application Serial No. 2018-032459, filed on Feb. 26, 2018. The disclosure of the prior application is considered part of the disclosure of this application, and is incorporated in its entirety into this application.

TECHNICAL FIELD

The present disclosure relates to a method of providing a DHCP server in a virtual customer premises equipment (CPE) that is obtained by integrating functions of a CPE on a virtualization platform of a network of a service provider.

BACKGROUND ART

A wide variety of functions of a CPE installed in premises of a service subscriber are integrated into a network of a service provider as a virtual CPE so that each of the functions is provided using a virtualization technology. FIG. 1 illustrates a configuration example including the virtual CPE (vCPE). In the example illustrated in FIG. 1, a virtual CPE 20 provides a service to an on-premises NW via an access network 30 and a CPE 10.

As illustrated in FIG. 1, a dynamic DHCP server operates on the virtual CPE 20. In response to an IP address-dispensing request from a terminal of the premises (client), the DHCP server of the virtual CPE 20 dispenses an IP address.

Various functions of the virtual CPE 20, such as the DHCP server, operate on VMs that is the same or different virtual environments to achieve redundancy, and the service is continued by switching the VMs when the function at the time of normality stops. An example in which the DHCP server switches from a VM1 to a VM2 is illustrated in FIG. 2.

CITATION LIST

Non Patent Literature

NPL 1: "ETSI GS NFV 001 V1.1.1 (2013-10) Network Functions Virtualisation (NFV): Use Cases", http://www.etsi.org/deliver/etsi_gs/NFV/001_099/001/01.01.01_60/gs_NFV001v010101p.pdf, searched on Feb. 19, 2018

SUMMARY OF THE INVENTION

Technical Problem

In a redundant method of a related art such as illustrated in FIG. 2, the on-premises NW is no longer able to communicate with the DHCP server of a preliminary VM when a disconnection occurs in the access network 30 between the CPE 10 and the virtual CPE 20 or when a defect occurs on a virtual platform that manages a preliminary VM such as a host OS and a virtual switch.

As a result, a problem may arise where a network device such as a file server or a network printer becomes unusable since an IP address is not dispensed when a lease period of the IP address is expired in a terminal of the on-premises NW under control of the CPE 10 or when the terminal newly joins the network.

The present disclosure is made in view of the foregoing, and an object of the present disclosure is to provide a technology that enables, in an environment in which the CPE is connected to the virtual CPE having the DHCP server via the access network, a terminal under control of the CPE to receive "address dispensing" even when the CPE cannot communicate with the DHCP server in the virtual CPE.

Means for Solving the Problem

According to a disclosed technology, there is provided a communication apparatus connected to a virtual apparatus having an address dispensing function via an access network, wherein the communication apparatus includes a communication confirmation unit configured to perform a communication confirmation between the virtual apparatus and the communication apparatus; and an address dispensing unit configured to dispense an address to a user terminal under control of the communication apparatus when communication between the virtual apparatus and the communication apparatus is not able to be confirmed by the communication confirmation unit, and the address dispensing unit causes the user terminal to forcibly release the address when the communication between the virtual apparatus and the communication apparatus is able to be confirmed by the communication confirmation unit.

Effects of the Invention

According to a disclosed technology, a technology is provided that enables, in an environment in which a CPE is connected to a virtual CPE having a DHCP server via an access network, a terminal under control of the CPE to receive the address dispensing even when the CPE cannot communicate with the DHCP server in the virtual CPE.

DESCRIPTION OF EMBODIMENTS

Embodiments of the present disclosure (present embodiment) will be described below with reference to the drawings. The embodiments described below are merely an example, and the embodiments to which the present disclosure is applied is not limited to the following embodiments.

System Configuration, Operation Overview

Figure 1:
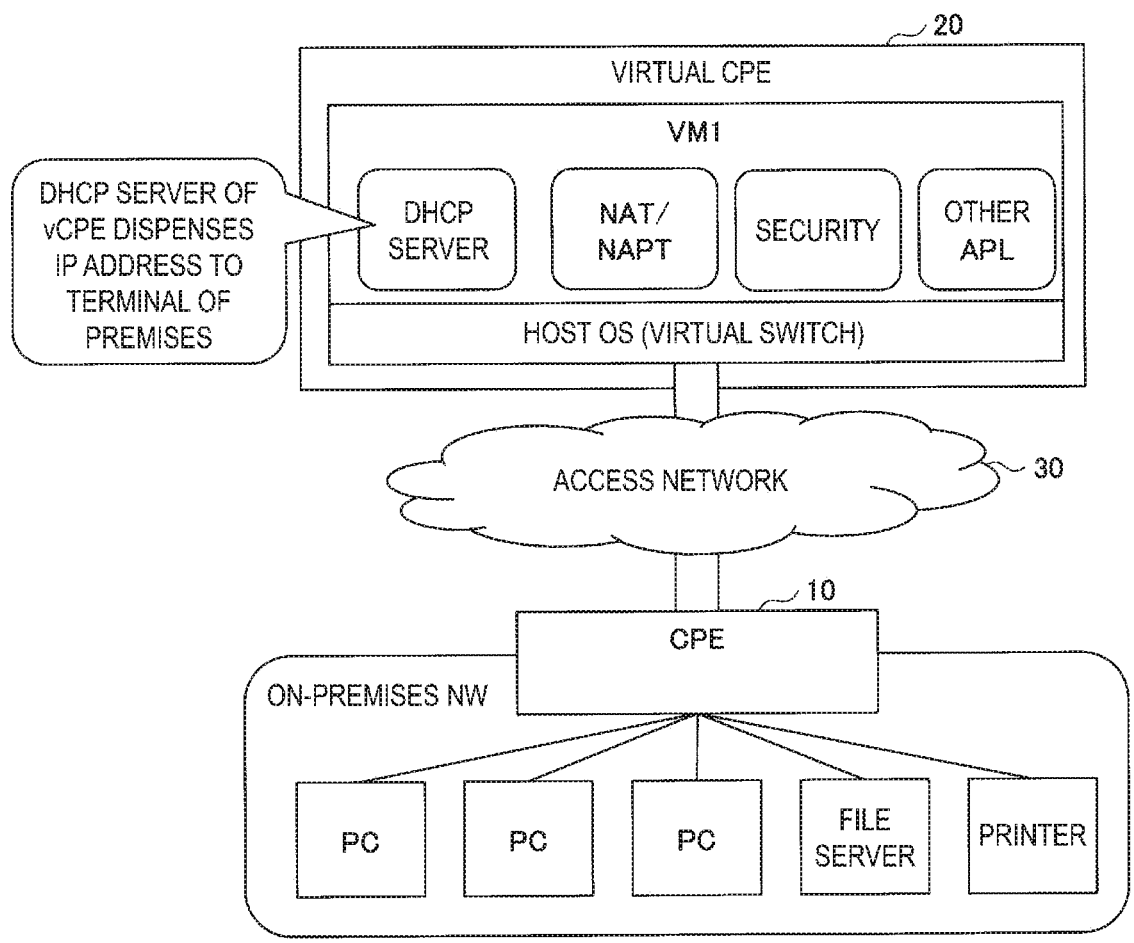
FIG. 1 is a diagram for explaining a virtual CPE.
Figure 2:
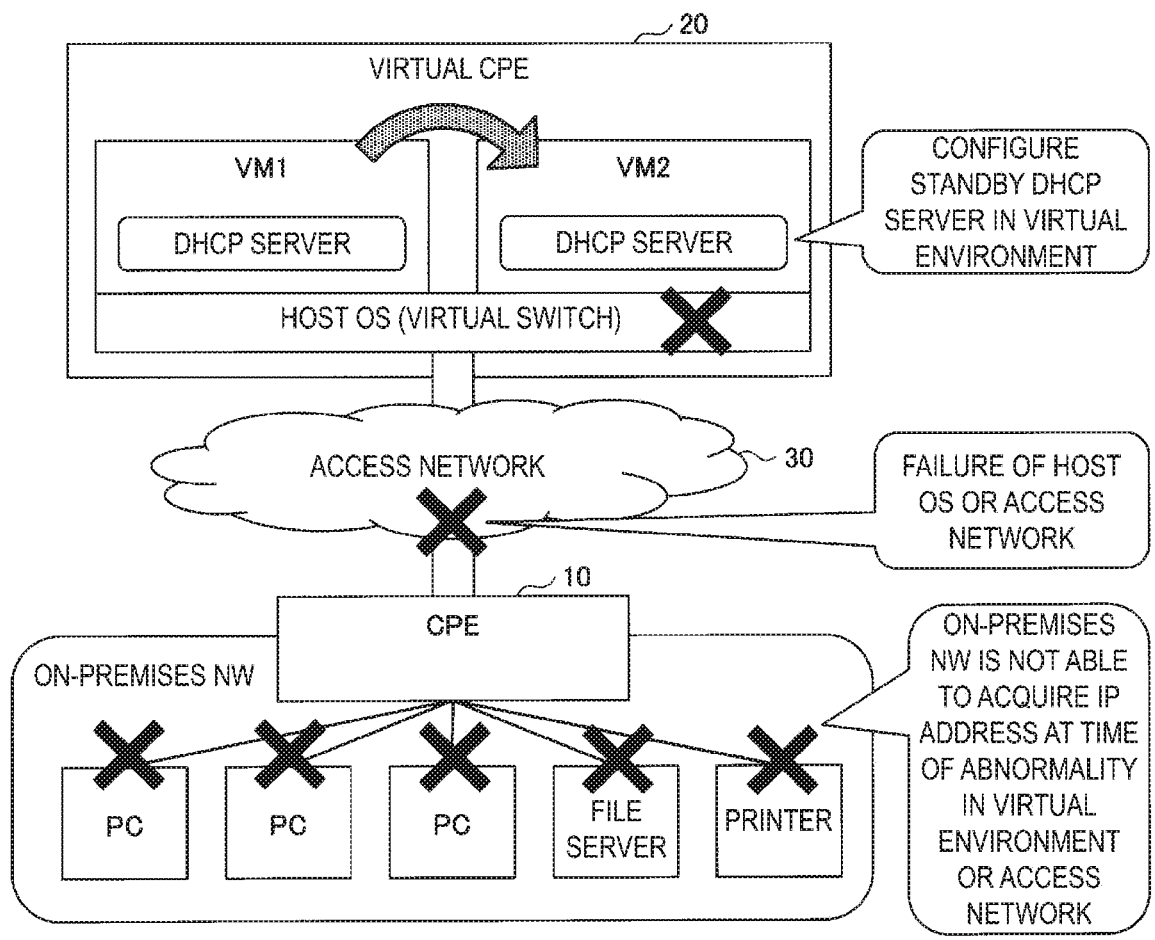
FIG. 2 is a diagram for explaining a problem.
Figure 3:
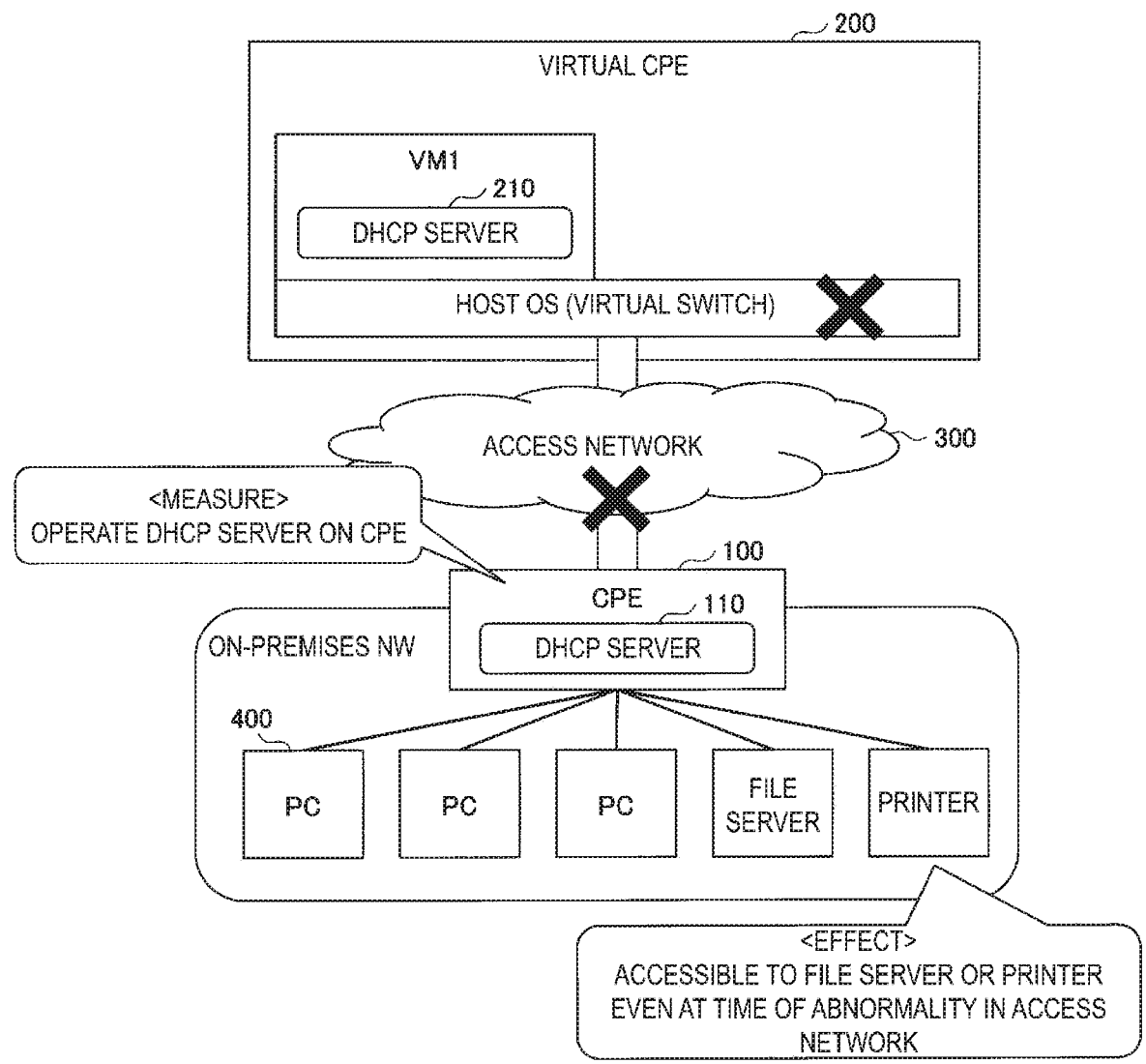
FIG. 3 is a diagram for explaining an overview of an embodiment.

FIG. 3 is a diagram illustrating a system configuration and an operation overview according to the present embodiment. As illustrated in FIG. 3, in a system according to the present embodiment, a CPE 100 having various devices of an on-premises NW under its control is connected to a virtual CPE 200 via an access network 300. The various devices in the on-premises NW include a PC, a file server, a printer, or the like, and in FIG. 3, the PC is illustrated as an example of a user terminal 400. Note that the CPE may be referred to as a "communication apparatus". Further, the virtual CPE may be referred to as a virtual apparatus.

As illustrated in FIG. 3, in the system, a DHCP server 110 is operated on the CPE 100 to substitute for a DHCP server 210 of the virtual CPE 200. As a result, even when a failure of the virtual platform or a disconnection of the access network occurs, a minimum service of the on-premises NW can continue.

About an Address Range to be Dispensed

When the DHCP server 110 of the CPE 100 allocates an IP address, it is necessary to dispense the IP address that is the same subnet and does not overlap with an IP address already allocated by the virtual CPE 200. Accordingly, in the present embodiment, a method according to any one of a method 1 to a method 3 described below is used.

Method 1

Figure 4:
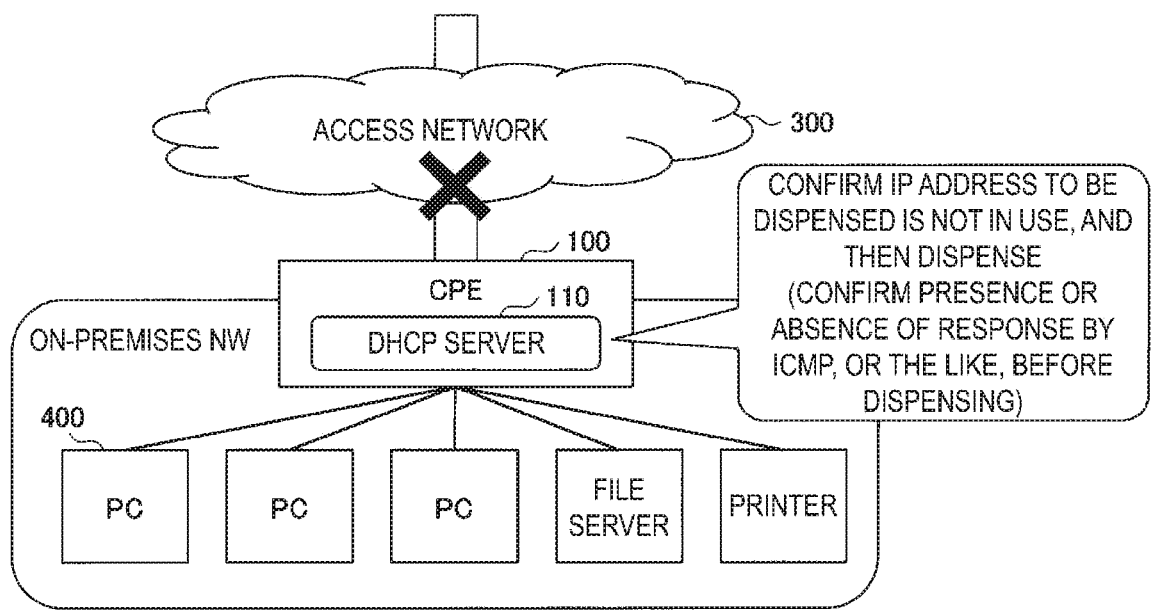
FIG. 4 is a diagram for explaining a method 1 for the address dispensing.

FIG. 4 is a diagram illustrating the method 1. As illustrated in FIG. 4, in the method 1, the DHCP server 110 of the CPE 100 confirms whether an IP address is not in use before dispensing the IP address, and dispenses the IP address if it can be confirmed that the IP address is not in use. Confirmation described above can be performed, for example, by the presence or absence of an ICMP echo reply.

Method 2

Figure 5:
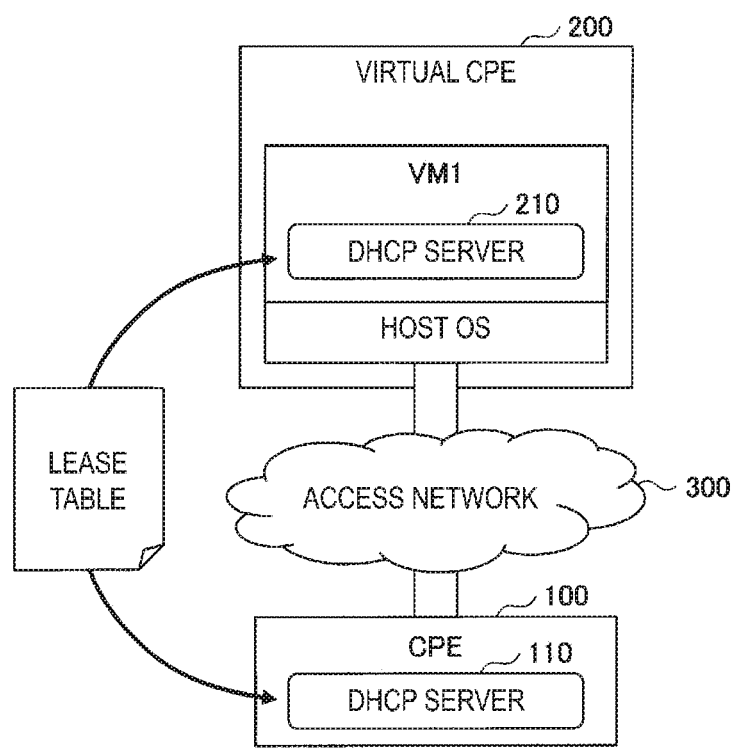
FIG. 5 is a diagram for explaining a method 2 for the address dispensing.

FIG. 5 is a diagram illustrating the method 2. As illustrated in FIG. 5, in the method 2, a lease information file (lease table) is shared in advance between the DHCP server 210 of the virtual CPE 200 and the DHCP server of the CPE 100.

Method 3

Figure 6:
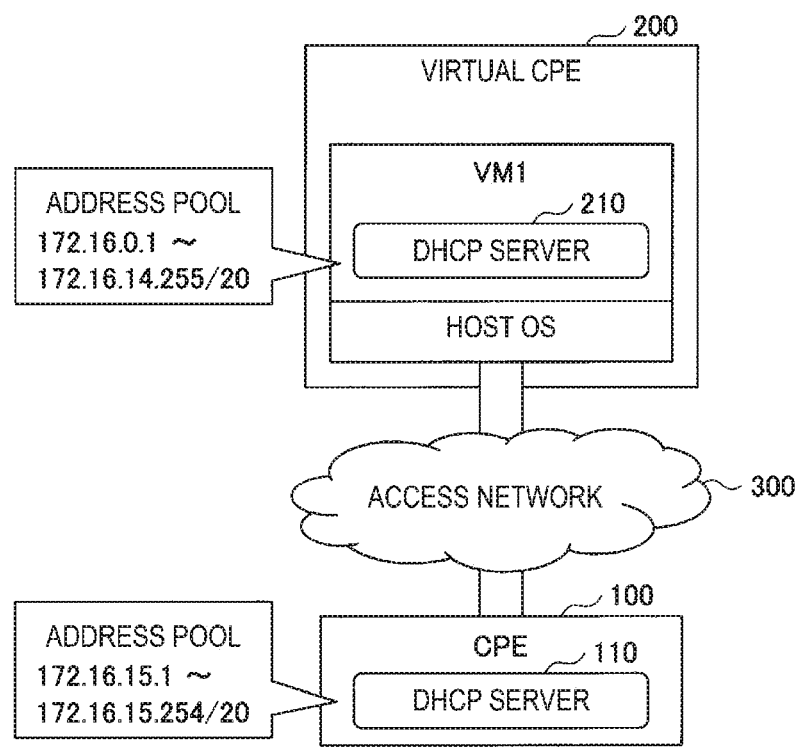
FIG. 6 is a diagram for explaining a method 3 for the address dispensing.

FIG. 6 is a diagram illustrating the method 3. As illustrated in FIG. 6, in the method 3, different address ranges in the same subnet are designated in advance for the DHCP server 210 of the virtual CPE 200 and the DHCP server 110 of the CPE 100.

Figure 7:
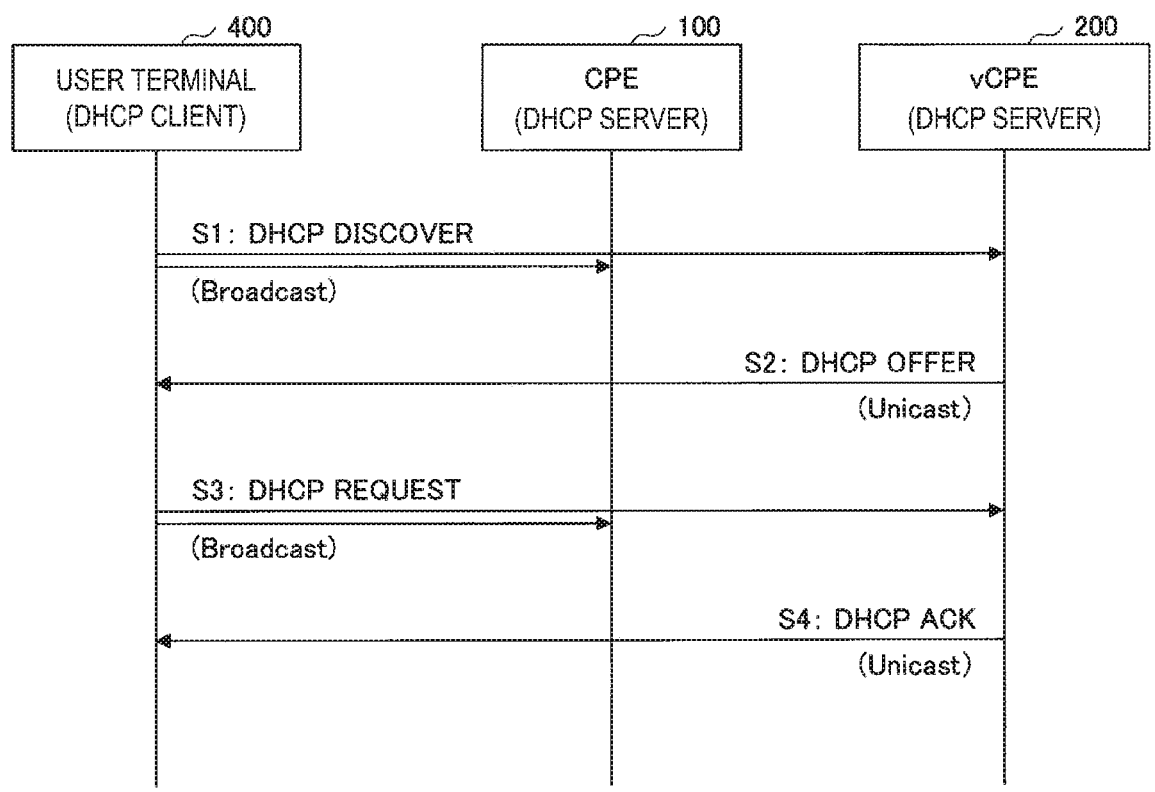
FIG. 7 is a diagram for explaining a normal operation of a DHCP server.

Hereinafter, the operation when the DHCP server 110 of the CPE 100 functions will be described, but before the description, a sequence when the DHCP server 210 in the virtual CPE 200 normally operates will be described with reference to FIG. 7.

In an S1, the user terminal 400, which is a DHCP client, requests of the DHCP server for the IP address dispensing by broadcasting a DHCP DISCOVER. In an S2, the DHCP server 210 of the virtual CPE 200 offers an IP address to be dispensed to the user terminal 400 by a unicast DHCP OFFER.

In an S3, the user terminal 400 requests of the DHCP server for the offered IP address by broadcasting a DHCP REQUEST. In an S4, a DHCP ACK is returned from the DHCP server 210 of the virtual CPE 200 to the user terminal 400, and the IP address dispensing to the user terminal 400 is approved.

Hereinafter, three examples when the DHCP server 110 of the CPE 100 operates will be described as Examples 1 to 3.

Example 1

Figure 8:
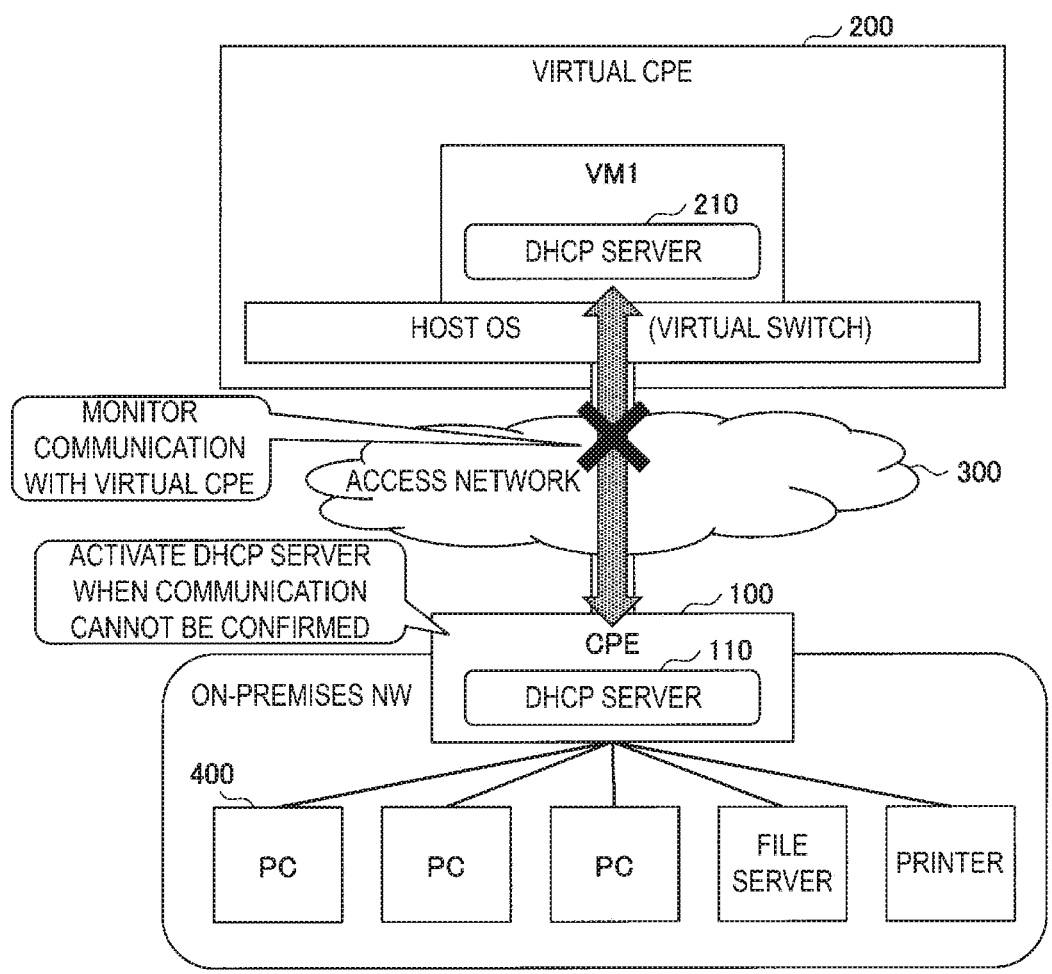
FIG. 8 is a diagram for explaining Example 1.

As illustrated in FIG. 8, in Example 1, the CPE 100 performs communication monitoring with the virtual CPE 200, and when the communication between the CPE 100 and the virtual CPE 200 cannot be confirmed, the CPE 100 determines as abnormal and activates the DHCP server 110. When the communication between the CPE 100 and the virtual CPE 200 can be confirmed, the CPE 100 determines as normal, performs a force release (Force renew) on the client that has dispensed the IP address, and shuts down the DHCP server 110. The CPE 100 includes a function of executing ping, for example, as a unit for confirming communication. Further, the DHCP server 110 is an example of an address dispensing unit.

Figure 9:
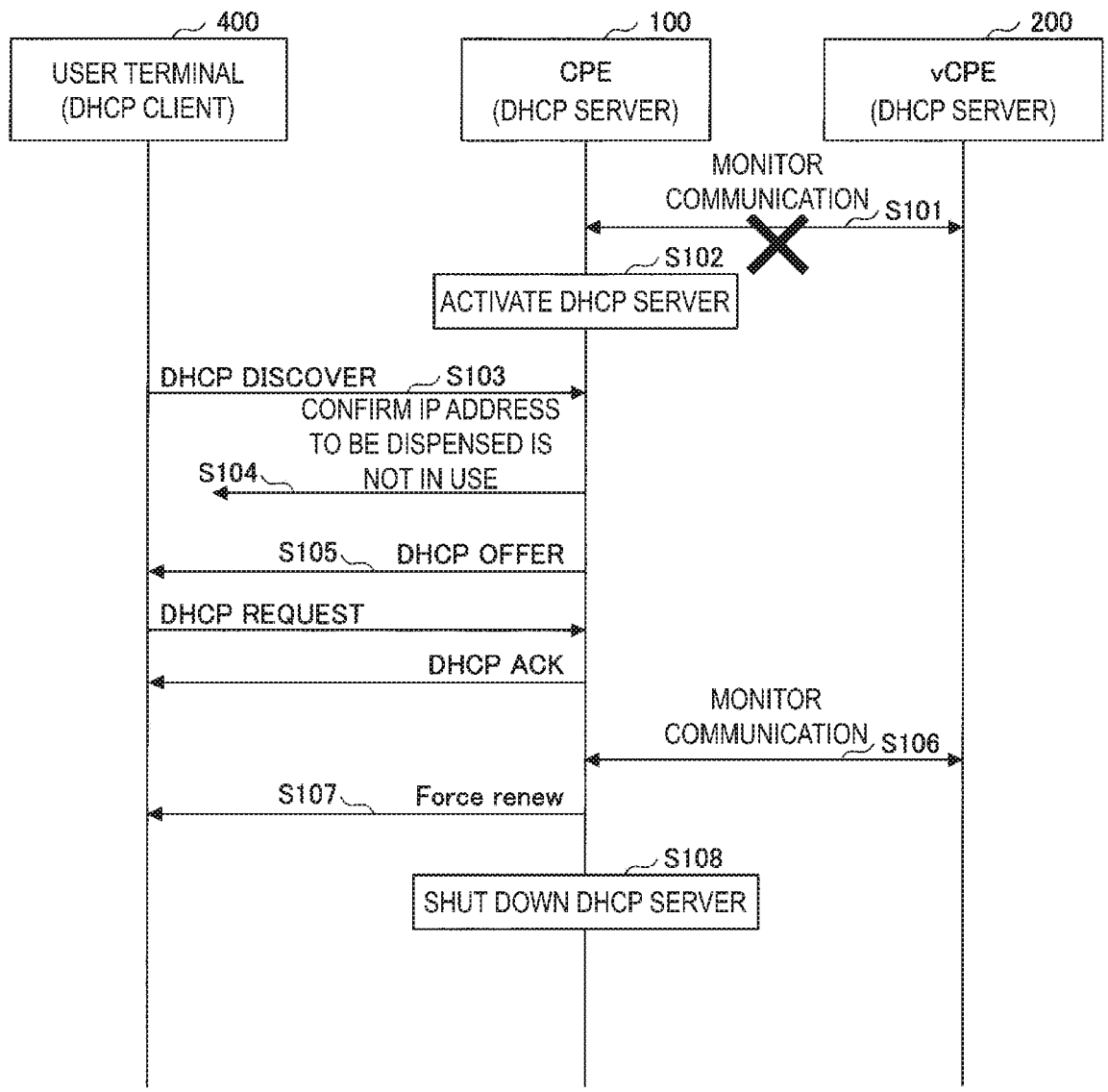
FIG. 9 is a sequence diagram of DHCP processing in Example 1.
Figure 10:
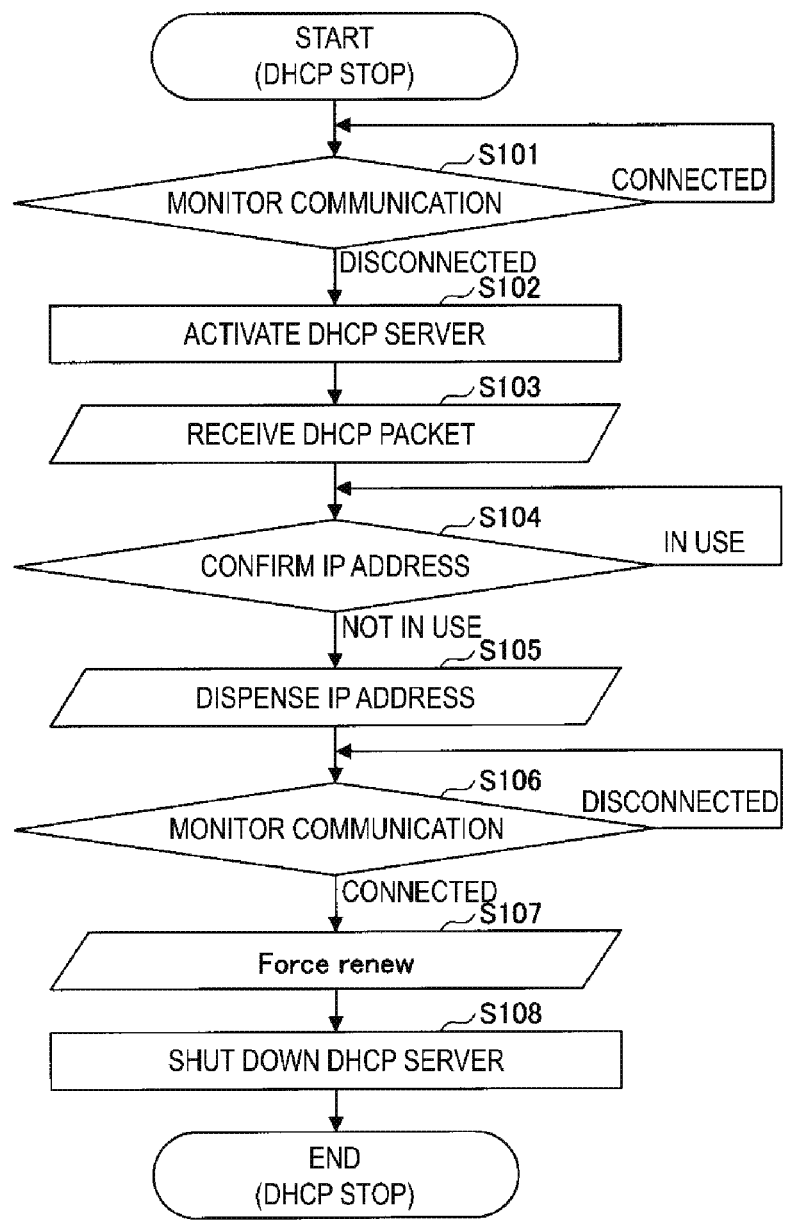
FIG. 10 is a flowchart illustrating an operation of a CPE in Example 1.

FIG. 9 is a sequence diagram in Example 1, and FIG. 10 is a flowchart illustrating an operation of the CPE 100 in the sequence illustrated in FIG. 9. An operation example in Example 1 will be described based on FIG. 9 and FIG. 10.

In an S101, the CPE 100 performs communication monitoring with the virtual CPE. Note that the communication monitoring is constantly performed (for example, periodically). As a result of the communication monitoring, if the CPE 100 detects communication disconnection, the CPE 100 activates the DHCP server 110 in an S102.

In an S103, a DHCP DISCOVER is transmitted from the user terminal 400, and the DHCP server 110 of the CPE 100 receives the DHCP packet. In an S104, the DHCP server 110 confirms whether an IP address to be dispensed is not used, and if not, offers the IP address to be dispensed by transmitting a DHCP OFFER in an S105. Through an exchange of a DHCP REQUEST and a DHCP ACK, the IP address is dispensed to the user terminal 400.

In an S106, when the CPE 100 can confirm connection of communication with the virtual CPE 200 as a result of the communication monitoring, the CPE 100 performs Force renew on the user terminal 400 to cause the user terminal 400 to forcibly release the dispensed IP address in an S107, and shuts down the DHCP server 110 in an S108.

Example 2

Figure 11:
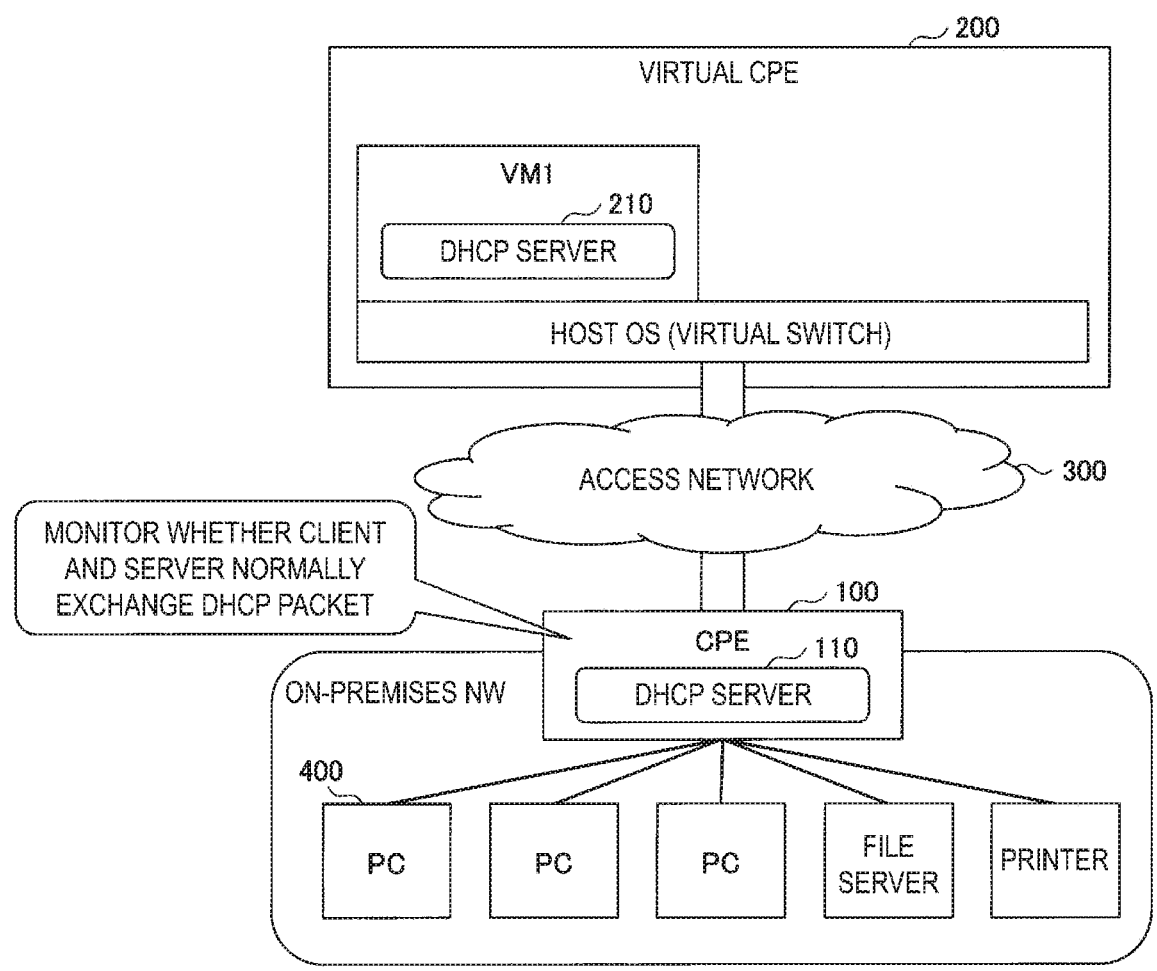
FIG. 11 is a diagram for explaining Example 2.

Next, Example 2 is described. As illustrated in FIG. 11, in Example 2, the CPE 100 has a function of monitoring a packet flow and monitors whether the exchange of the DHCP packet is normally performed between the client (here referred to as the user terminal 400) and the DHCP server 210. Note that here, the DHCP server 110 may be provided with a function to monitor the packet flow, but a function other than the DHCP server 110 in the CPE 100 may be provided as a function to monitor the packet flow. When a DHCP OFFER, in response to a DHCP DISCOVER from the user terminal 400, is not returned from the virtual CPE 200 for a certain period of time, the CPE 100 determines that there is an abnormality, and performs the dispensing of the IP address. Thereafter, when a transmission of the DHCP OFFER from the virtual CPE 200 is confirmed, the CPE 100 confirms the communication between the CPE 100 and the virtual CPE 200, and performs the force release (Force renew) on the user terminal 400 that has dispensed the IP address.

Figure 12:
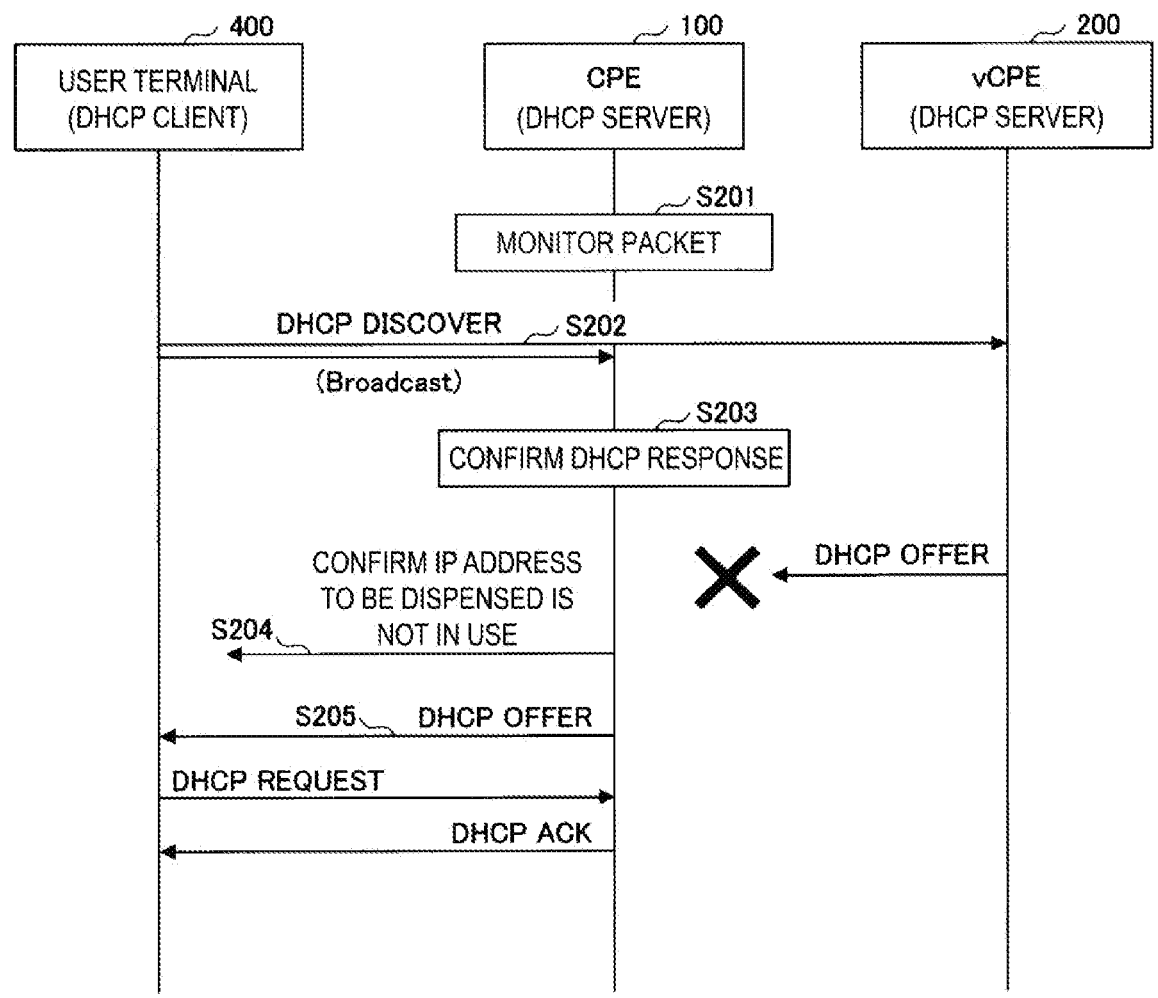
FIG. 12 is a sequence diagram of DHCP processing in Example 2.
Figure 13:
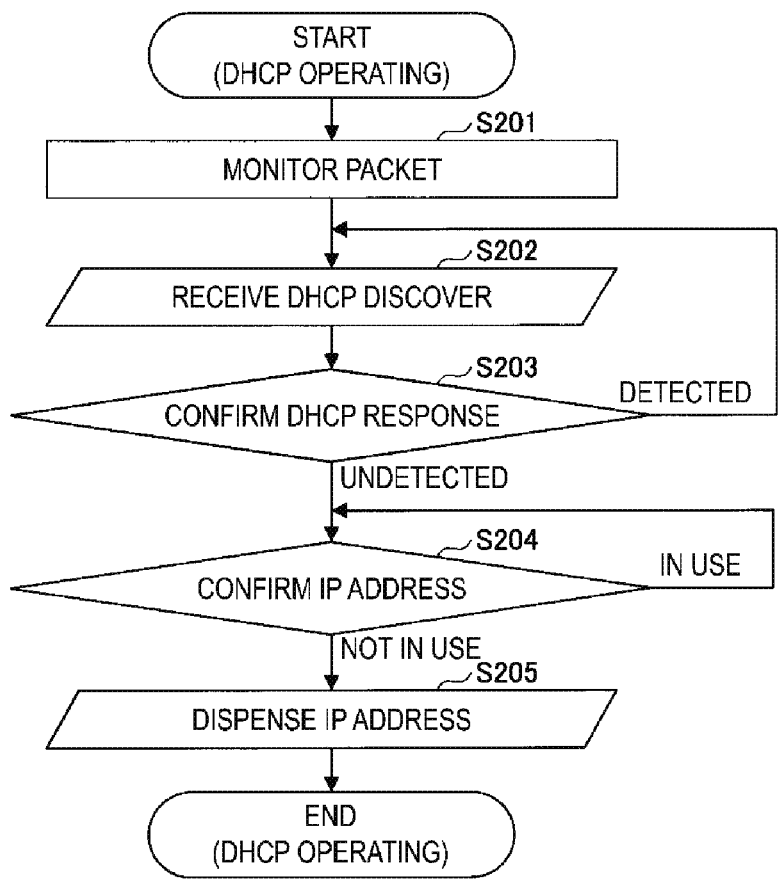
FIG. 13 is a flowchart illustrating an operation of a CPE in Example 2.

FIG. 12 is a sequence diagram in Example 2, and FIG. 13 is a flowchart illustrating an operation of the CPE 100 in the sequence illustrated in FIG. 12. An operation example in Example 2 will be described based on FIG. 12 and FIG. 13.

In an S201, the DHCP server 110 of the CPE 100 performs packet monitoring. Note that the packet monitoring is always performed during the operation of the DHCP server 110.

In an S202, the DHCP DISCOVER is transmitted from the user terminal 400. The DHCP server 110 of the CPE 100 performs packet monitoring, and thus the DHCP server 110 receives the DHCP DISCOVER and waits for a subsequent DHCP response.

In an S203, the CPE 100 performs confirmation of the DHCP response but detects that the DHCP response is undetected for a certain amount of time (predetermined time).

In an S204, the DHCP server 110 of the CPE 100 confirms whether the IP address to be dispensed is not in use, and if not, transmits the DHCP OFFER in an S205, and dispenses the IP address via the exchange of the DHCP REQUEST and the DHCP ACK.

As described above, if the DHCP OFFER (an OFFER in response to the DHCP DISCOVER transmitted from the user terminal 400) from the DHCP server 210 of the virtual CPE 200 can be confirmed because of the recovery of the communication of the access network, or the like, the CPE 100 performs force release (Force renew) on the user terminal 400 that has dispensed the IP address.

Example 3

Figure 14:
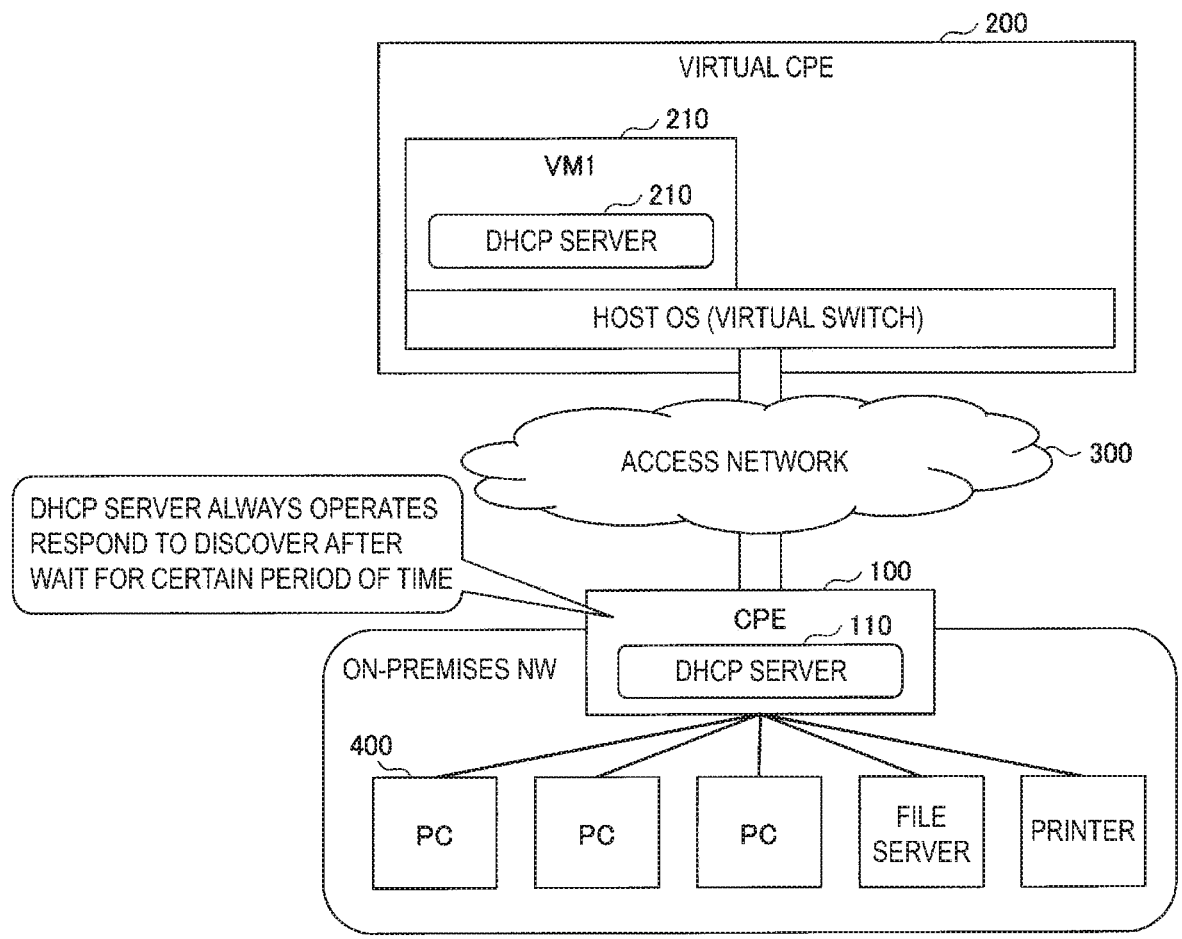
FIG. 14 is a diagram for explaining Example 3.

Next, Example 3 is described. As illustrated in FIG. 14, in Example 3, the DHCP server 110 of the CPE 100 always returns an OFFER in response to a DHCP DISCOVER from the client (user terminal 400) after waiting for a certain period of time (predetermined time). This is a period of time allowing, when the communication between the user terminal 400 and the DHCP server 210 of the virtual CPE 200 is normal, an OFFER transmitted from the DHCP server 110 of the CPE 100 to reach the user terminal 400 after an OFFER transmitted from the DHCP server 210 of the CPE 200 reaches the user terminal 400. At the time of normality, the user terminal 400 receives the OFFER from two DHCP servers, but applies only the OFFER that arrived first from the virtual CPE 200. At the time of abnormality, the user terminal 400 receives only the OFFER from the CPE 100.

Figure 15:
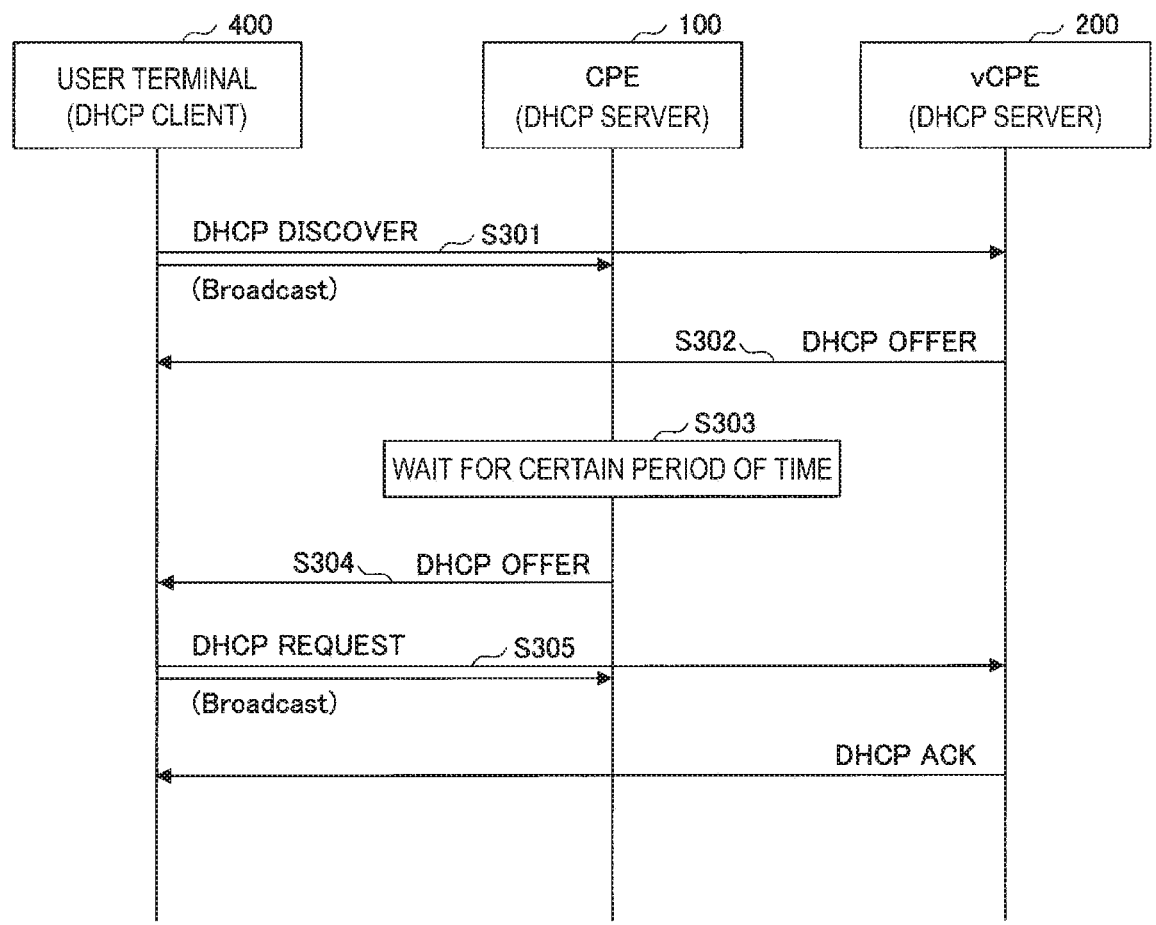
FIG. 15 is a sequence diagram of DHCP processing at the time of normality in Example 3.
Figure 16:
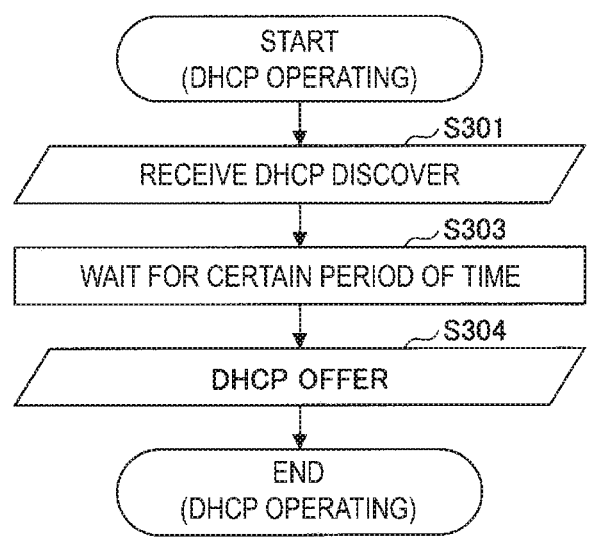
FIG. 16 is a flowchart illustrating an operation of a CPE at the time of normality in Example 3.

FIG. 15 is a sequence diagram at the time of normality in Example 3, and FIG. 16 is a flowchart illustrating an operation of the CPE 100 in the sequence illustrated in FIG. 15. An operation example at the time of normality in Example 3 will be described based on FIG. 15 and FIG. 16.

In an S301, the DHCP DISCOVER is transmitted from the user terminal 400, and the DHCP server 110 of the CPE 100 and the DHCP server 210 of the CPE 200 receive the DHCP DISCOVER. In an S302, the DHCP OFFER from the DHCP server 210 of the virtual CPE 200 is immediately transmitted. On the other hand, the DHCP server 110 of the CPE 100 waits for a certain period of time (S303), and then transmits the DHCP OFFER in an S304. In an S305, the user terminal 400 transmits a DHCP REQUEST requesting the IP address dispensing in response to the DHCP OFFER that arrived first in the S302.

Figure 17:
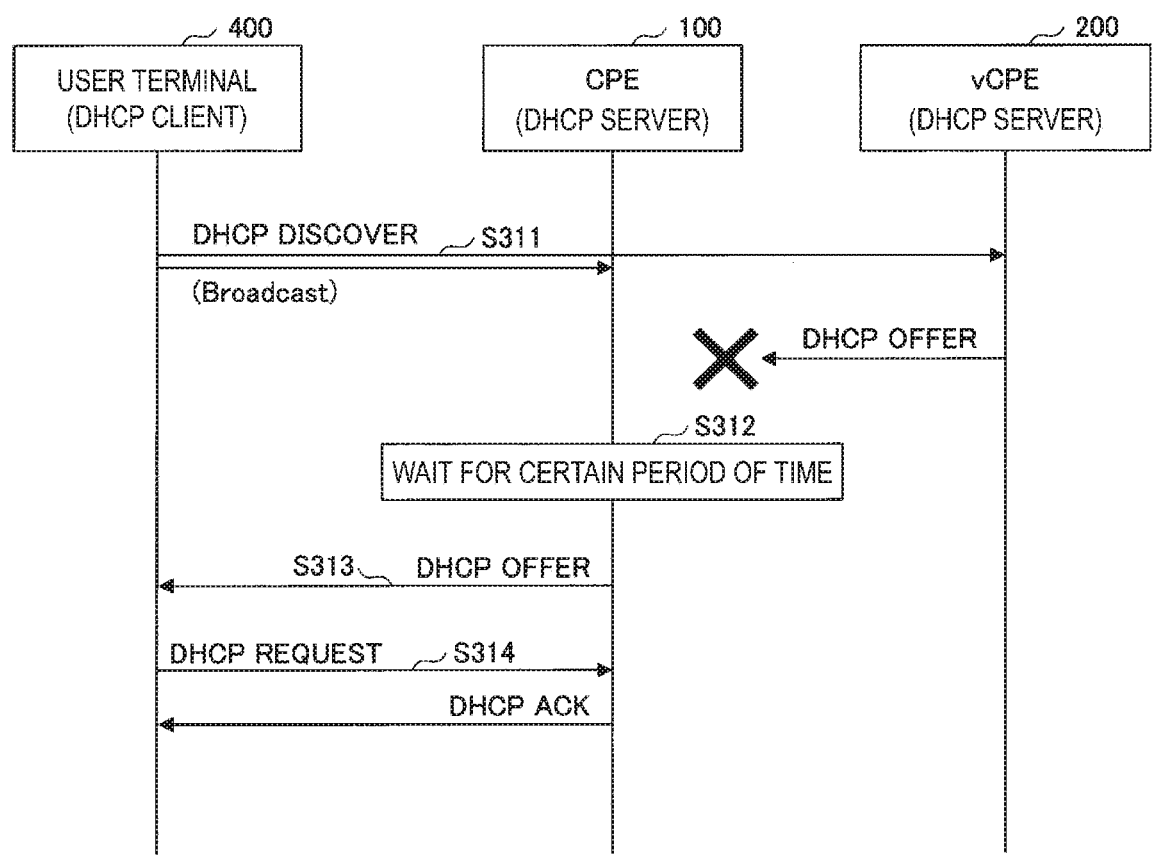
FIG. 17 is the sequence diagram of DHCP processing at the time of abnormality in Example 3.
Figure 18:
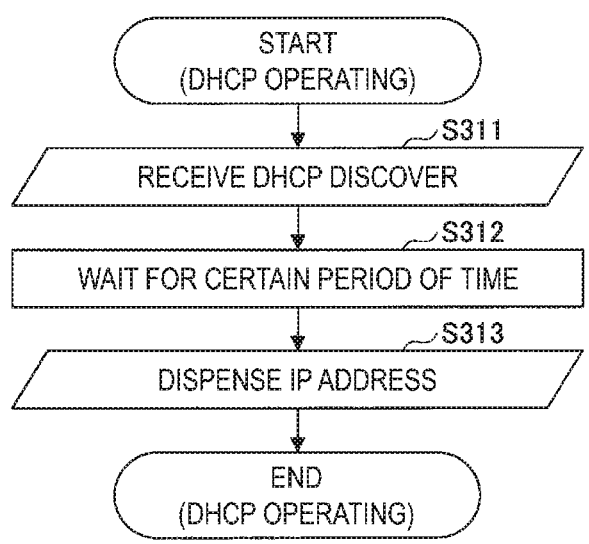
FIG. 18 is a flowchart illustrating an operation of the CPE at the time of abnormality in Example 3.

FIG. 17 is a sequence diagram at the time of abnormality in Example 3, and FIG. 18 is a flowchart illustrating an operation of the CPE 100 in the sequence illustrated in FIG. 17. An operation example at the time of abnormality in Example 3 will be described based on FIG. 17 and FIG. 18.

In an S311, the DHCP DISCOVER is transmitted from the user terminal 400, and the DHCP server 110 of the CPE 100 and the DHCP server 210 of the CPE 200 receive the DHCP DISCOVER. The DHCP OFFER is transmitted from the DHCP server 210 of the virtual CPE 200, but the DHCP OFFER does not reach the user terminal 400 due to the communication abnormality.

On the other hand, the DHCP server 110 of the CPE 100 waits for a certain period of time (S312), and then transmits the DHCP OFFER in an S313. In an S314, the DHCP REQUEST in response to the DHCP OFFER of the S313 is transmitted from the user terminal 400.

As described above in Examples 1 to 3, in the technology according to the present disclosure, the DHCP server 110 is operated on the CPE 100, and thus a minimum service in the on-premises NW under control of the CPE 100 can continue even when the abnormality occurs in the host OS of the virtual CPE 200 or the access network 300.

Hardware Configuration Example

The CPE 100 in the present embodiment can be implemented, for example, by causing a computer (including a communication apparatus having a CPU and a memory) to execute a program describing the processing content described in the present embodiment.

In other words, the CPE 100 can be implemented by executing a program corresponding to the processing executed in the CPE 100 using a hardware resource such as the CPU and the memory built in the computer. The program can be recorded, stored, or distributed on a computer readable recording medium (such as a portable memory). It is also possible to provide the program described above through a network, such as the Internet or email.

Figure 19:
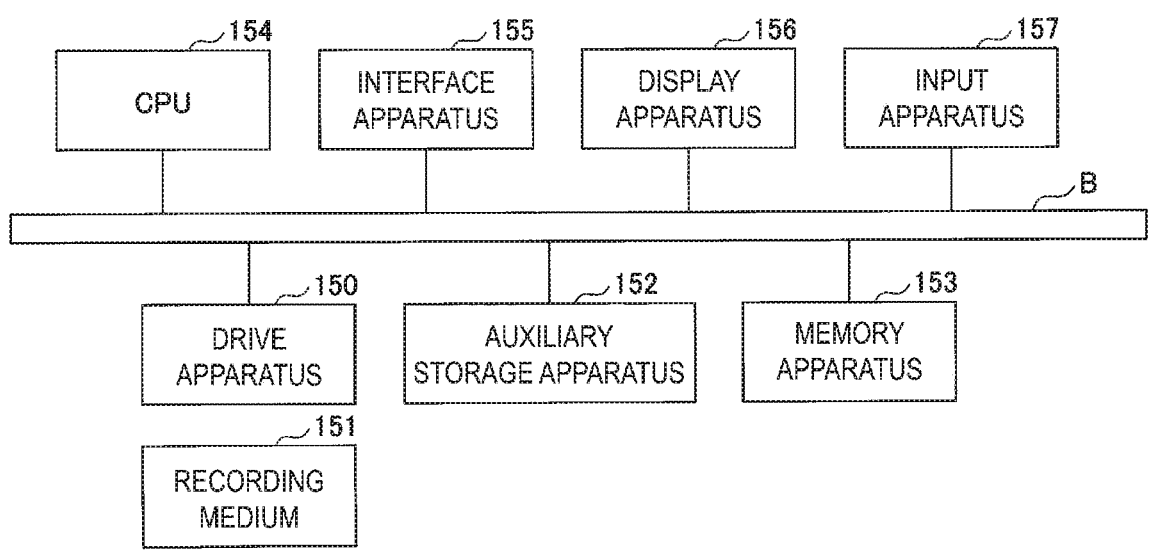
FIG. 19 is a diagram illustrating a hardware configuration example of an apparatus.

FIG. 19 is a diagram illustrating a hardware configuration example of a computer according to the present embodiment. The computer of FIG. 19 includes a drive apparatus 150, an auxiliary storage apparatus 152, a memory apparatus 153, a CPU 154, an interface apparatus 155, a display apparatus 156, an input apparatus 157, or the like, each of which is interconnected to one another via a bus B.

The program implementing the processing in the computer is provided, for example, by a recording medium 151 such as a CD-ROM or a memory card. If the recording medium 151 with the program stored thereon is set in the drive apparatus 150, the program is installed on the auxiliary storage apparatus 152 from the recording medium 151 via the drive apparatus 150. However, the program installation does not necessarily need to be performed by the recording medium 151, but may be downloaded from the other computer via the network. The auxiliary storage apparatus 152 stores an installed program and stores the required files, data, or the like.

The memory apparatus 153 reads and stores the program from the auxiliary storage apparatus 152 when there is an instruction to operate the program. The CPU 154 implements a function related to the CPE 100 according to the program stored in the memory apparatus 153. The interface apparatus 155 is used as an interface for connecting to a network.

The display apparatus 156 displays a graphical user interface (GUI), or the like, by the program. The input apparatus 157 is constituted with a keyboard, a mouse, a button, a touch panel, or the like, and is used to input various operation instructions. Note that when an operation is performed on the CPE 100 only remotely, the input apparatus 157 and the display apparatus 156 may not be provided.

Summary of Embodiment

As described above, the present embodiment provides a communication apparatus connected to a virtual apparatus having an address dispensing function via an access network, in which the communication apparatus includes the following three units. A communication confirmation unit performs communication confirmation between the virtual apparatus and the communication apparatus. An address dispensing unit dispenses an address to a user terminal under control of the communication apparatus when a communication between the virtual apparatus and the communication apparatus is not able to be confirmed by the communication confirmation unit. A force release unit is provided, in which the address dispensing unit causes the user terminal to forcibly release the address when the communication between the virtual apparatus and the communication apparatus is able to be confirmed by the communication confirmation unit.

Further, according to the present embodiment, a communication apparatus connected to a virtual apparatus having an address dispensing function via an access network is provided, the communication apparatus including an address dispensing unit configured to transmit, when a packet offering an address to be dispensed is not received from the virtual apparatus after receiving a packet requesting the address dispensing from a user terminal under control of the communication apparatus, the packet offering an address to be dispensed to the user terminal.

Further, according to the present embodiment, a communication apparatus connected to a virtual apparatus having an address dispensing function via an access network is provided, the communication apparatus including an address dispensing unit configured to transmit, when a packet requesting the address dispensing is received from a user terminal under control of the communication apparatus, a packet offering an address to be dispensed to the user terminal after waiting for a predetermined time.

The present embodiment has been described above, but the present disclosure is not limited to such specific embodiments, and various modifications and changes are possible within the scope of the gist of the present disclosure described in the claims.

REFERENCE SIGNS LIST 10, 100 CPE
20, 200 Virtual CPE
30, 300 Access network
400 User terminal
150 Drive apparatus
151 Recording medium
152 Auxiliary storage apparatus
153 Memory apparatus
154 CPU
155 Interface apparatus
156 Display apparatus
157 Input apparatus

The invention claimed is:

1. A communication apparatus connected to a virtual apparatus for dispensing an address via an access network, the communication apparatus comprising:
a communication confirmation unit, including one or more processors, configured to monitor communication between the virtual apparatus and the communication apparatus; and
an address dispensing unit, including one or more processors, configured to dispense, based on the communication confirmation unit detecting communication disconnection between the virtual apparatus and the communication apparatus, an address to a user terminal under control of the communication apparatus,
wherein the address dispensing unit causes, based on the communication confirmation unit confirming communication between the virtual apparatus and the communication apparatus, the user terminal to release the dispensed address.

2. A communication apparatus connected to a virtual apparatus for dispensing an address via an access network, the communication apparatus comprising:
a communication confirmation unit, including one or more processors, configured to monitor a packet flow between the virtual apparatus and the communication apparatus; and
an address dispensing unit configured to transmit, based on a packet offering an address to be dispensed not being received from the virtual apparatus after receiving, from a user terminal under control of the communication apparatus, a packet requesting the address, the packet offering the address to the user terminal,
wherein the address dispensing unit causes, based on the communication confirmation unit confirming communication between the virtual apparatus and the communication apparatus, the user terminal to release the address.

3. A communication apparatus connected to a virtual apparatus for dispensing an address via an access network, the communication apparatus comprising:
a communication confirmation unit, including one or more processors, configured to monitor a packet flow between the virtual apparatus and the communication apparatus; and
an address dispensing unit configured to transmit, based on a packet requesting an address to be dispensed being received from a user terminal under control of the communication apparatus, a packet offering an address to be dispensed to the user terminal after waiting for a predetermined time,
wherein the address dispensing unit causes, based on the communication confirmation unit confirming communication between the virtual apparatus and the communication apparatus, the user terminal to release the address.

4. A communication method executed by a communication apparatus connected to a virtual apparatus for dispensing an address via an access network, the communication method comprising:
monitoring a communication between the virtual apparatus and the communication apparatus;

dispensing, based on detecting communication disconnection between the virtual apparatus and the communication apparatus, an address to a user terminal under control of the communication apparatus; and causing, based on confirming communication between the virtual apparatus and the communication apparatus after the address is dispensed, the user terminal to release the dispensed address.

5. A communication method executed by a communication apparatus connected to a virtual apparatus for dispensing an address via an access network, the communication method comprising:

monitoring a packet flow between the virtual apparatus and the communication apparatus;

transmitting, based on a packet offering an address to be dispensed not being received from the virtual apparatus after receiving, from a user terminal under control of the communication apparatus, a packet requesting the address, the packet offering the address to the user terminal; and causing, based on confirming communication between the virtual apparatus and the communication apparatus, the user terminal to release the address.

6. A communication method executed by a communication apparatus connected to a virtual apparatus for dispensing an address via an access network, the communication method comprising:

monitoring a packet flow between the virtual apparatus and the communication apparatus;

transmitting, based on a packet requesting an address to be dispensed being received from a user terminal under control of the communication apparatus, a packet offering an address to be dispensed to the user terminal after waiting for a predetermined time; and causing, based on confirming communication between the virtual apparatus and the communication apparatus, the user terminal to release the address.

7. A non-transitory recording medium storing a program, wherein execution of the program causes one or more computers to perform operations comprising:

monitoring a communication between a communication apparatus and a virtual apparatus, the communication apparatus connected to the virtual apparatus for dispensing an address via an access network;

dispensing, based on detecting communication disconnection between the virtual apparatus and the communication apparatus, an address to a user terminal under control of the communication apparatus; and causing, based on confirming communication between the virtual apparatus and the communication apparatus, the user terminal to release the dispensed address.

8. A non-transitory recording medium storing a program, wherein execution of the program causes one or more computers to perform operations comprising:

monitoring a packet flow between a virtual apparatus and a communication apparatus, the communication apparatus connected to the virtual apparatus for dispensing an address via an access network;

transmitting, based on a packet offering an address to be dispensed not being received from a virtual apparatus after receiving, from a user terminal under control of the communication apparatus, a packet requesting the address, the packet offering the address to the user terminal; and causing, based on confirming communication between the virtual apparatus and the communication apparatus, the user terminal to release the address.

9. A non-transitory recording medium storing a program, wherein execution of the program causes one or more computers to perform operations comprising:

monitoring a packet flow between a virtual apparatus and a communication apparatus, the communication apparatus connected to the virtual apparatus for dispensing an address via an access network;

transmitting, based on a packet requesting an address to be dispensed being received from a user terminal under control of the communication apparatus, a packet offering an address to be dispensed to the user terminal after waiting for a predetermined time; and causing, based on confirming communication between the virtual apparatus and the communication apparatus, the user terminal to release the address.

* * * * *